(12) United States Patent
Akagi et al.

(10) Patent No.: US 12,146,752 B2
(45) Date of Patent: Nov. 19, 2024

(54) MOVING NUMBER ESTIMATING DEVICE, MOVING NUMBER ESTIMATING METHOD, AND MOVING NUMBER ESTIMATING PROGRAM

(71) Applicant: NIPPON TELEGRAPH AND TELEPHONE CORPORATION, Tokyo (JP)

(72) Inventors: Yasunori Akagi, Tokyo (JP); Takuya Nishimura, Tokyo (JP); Takeshi Kurashima, Tokyo (JP); Hiroyuki Toda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 345 days.

(21) Appl. No.: 17/613,918

(22) PCT Filed: May 27, 2019

(86) PCT No.: PCT/JP2019/020950
§ 371 (c)(1),
(2) Date: Nov. 23, 2021

(87) PCT Pub. No.: WO2020/240670
PCT Pub. Date: Dec. 3, 2020

(65) Prior Publication Data
US 2022/0221287 A1    Jul. 14, 2022

(51) Int. Cl.
*G01C 21/34* (2006.01)
*H04W 4/029* (2018.01)

(52) U.S. Cl.
CPC ..... *G01C 21/3453* (2013.01); *G01C 21/3446* (2013.01); *H04W 4/029* (2018.02)

(58) Field of Classification Search
CPC ........... G01C 21/3453; G01C 21/3446; H04W 4/029; G06Q 10/04
See application file for complete search history.

(56) References Cited

U.S. PATENT DOCUMENTS

| | | | | |
|---|---|---|---|---|
| 2004/0088392 | A1* | 5/2004 | Barrett | G08G 1/0104 709/223 |
| 2016/0358190 | A1* | 12/2016 | Terrazas | G06F 18/22 |

(Continued)

OTHER PUBLICATIONS

Sheldon et al. (2011) "Collective Graphical Models" Proceedings of the 24th International Conference on Neural Information Processing Systems, Dec. 12, 2011.

(Continued)

*Primary Examiner* — Ryan Rink

(57) ABSTRACT

An intersection determination is made regarding whether or not a traffic route included in map information intersects a boundary between areas on a basis of the traffic route and an area shape between areas that are adjacent in the map information, the intersection determination being made for each pair of adjacent areas. On a basis of a weight determined for the boundary in a case where the intersection determination is made that no intersection exists, a movement cost graph expressing a movement cost for each area that accounts for the weight is constructed. A corrected shortest distance between areas is calculated on a basis of the movement cost graph. A human mobility between areas is estimated for each timestep, the timestep being the length of a predetermined time interval, according to a predetermined function for estimating the human mobility between areas on a basis of the corrected shortest distance between areas and a population of each of the areas at different predetermined times.

20 Claims, 6 Drawing Sheets

(56) References Cited

U.S. PATENT DOCUMENTS

| | | | |
|---|---|---|---|
| 2018/0189669 A1* | 7/2018 | Jeon | G06N 20/00 |
| 2021/0152435 A1* | 5/2021 | Poteat | H04L 47/823 |
| 2021/0216611 A1* | 7/2021 | Akagi | G06F 16/00 |
| 2022/0030382 A1* | 1/2022 | Klasson | G16H 50/20 |

OTHER PUBLICATIONS

Iwata et al. (2017) "Estimating People Flow from Spatiotemporal Population Data via Collective Graphical Mixture Models" ACM Transactions on Spatial Algorithms and Systems, vol. 3, No. 1, pp. 1-18.

Akagi et al. (2018) "A Fast and Accurate Method for Estimating People Flow from Spatiotemporal Population Data" Proceedings of the Twenty-Seventh International Joint Conference on Artificial Intelligence (IJCAI-18), Jul. 13, 2018.

\* cited by examiner

| TIMESTAMP | AREA ID | POPULATION INFORMATION |
|---|---|---|
| 7:00 AM | 001 | 123 PEOPLE |
| 8:00 AM | 002 | 234 PEOPLE |
| 9:00 AM | 003 | 131 PEOPLE |
| . . . | | |

| AREA ID | SHAPEFILE |
|---|---|
| 001 | 001.shp, 001.shx, 002.dbf |
| 002 | 001.shp, 001.shx, 002.dbf |
| 003 | 001.shp, 001.shx, 002.dbf |
| ... | |

— RAILWAY LINE

▪▪▪▪▪▪ INTERSECTION       ━━━ NO INTERSECTION

▪▪▪▶ WEIGHT 1    ━▶ WEIGHT 2 (λ)

Fig. 9

| AREA ID 1 | AREA ID 2 | AREA-TO-AREA DISTANCE |
|---|---|---|
| 001 | 001 | 1 |
| 001 | 002 | 4 |
| 001 | 003 | 6 |
| . . . | | |

Fig. 10

| DEPARTURE TIMESTAMP | DEPARTURE AREA | ARRIVAL AREA | HUMAN MOBILITY |
|---|---|---|---|
| 7:00 AM | 001 | 001 | 234 PEOPLE |
| 8:00 AM | 001 | 002 | 334 PEOPLE |
| 7:00 AM | 002 | 001 | 252 PEOPLE |
| . . . | | | |

Fig. 11

| Algorithm 1 Maximization of $f(s, \beta)$ |
|---|
| 1: Initialize $s^{(0)}, \beta^{(0)}$ |
| 2: $u \leftarrow 0$ |
| 3: while improving $f$ do |
| 4: $\quad s^{(u+1)} \leftarrow \arg\max_{s} f^{(u)}(s, \beta^{(u)})$ |
| 5: $\quad \beta^{(u+1)} \leftarrow \arg\max_{\beta} f^{(u)}(s^{(u+1)}, \beta)$ |
| 6: $\quad u \leftarrow u + 1$ |
| 7: end while |
| 8: return $s^{(u)}, \beta^{(u)}$ |

MOVING NUMBER ESTIMATING DEVICE, MOVING NUMBER ESTIMATING METHOD, AND MOVING NUMBER ESTIMATING PROGRAM

CROSS-REFERENCE TO RELATED APPLICATIONS

This application is a U.S. National Stage Application filed under 35 U.S.C. § 371 claiming priority to International Patent Application No. PCT/JP2019/020950, filed on 27 May 2019, the disclosure of which is hereby incorporated herein by reference in its entirety.

TECHNICAL FIELD

The present disclosure relates to a human mobility estimation device, a human mobility estimation method, and a human mobility estimation program.

BACKGROUND ART

Position information about humans obtained from sources such as GPS may be provided as temporal area population data in cases where individuals cannot be tracked because of privacy concerns. Here, temporal area population data refers to information about the number of people in each area for each timestep, which is the length of a certain time interval. Areas are assumed to be obtained by dividing a geographical space into a grid, for example. There exists a need to estimate the human mobility across areas and across timesteps from such temporal area population data.

In the related art, a framework (collective graphical model) that estimates individual probability models from aggregated data is used to estimate movement probability and human mobility across areas from demographic information.

CITATION LIST

Non-Patent Literature

Non-Patent Literature 1: D. R. Sheldon and T. G. Dietterich. Collective Graphical Models. In Proceedings of the 24th International Conference on Neural Information Processing Systems, pp. 1161-1169, 2011

Non-Patent Literature 2: T. Iwata, H. Shimizu, F. Naya, and N. Ueda. Estimating People Flow from Spatiotemporal Population Data via Collective Graphical Mixture Models. ACM Transactions on Spatial Algorithms and Systems, Vol. 3, No. 1, pp. 1-18, May 2017

SUMMARY OF THE INVENTION

Technical Problem

In the movement of people in the real world, certain relationships exist between the distance between areas and the human mobility between the areas, such as that people more readily move to nearby areas and less readily move to distance areas. However, the related art does not consider the influence that the distance between areas exerts on the ease of movement while accounting for traffic information, and has a limitation in that the estimation accuracy is lowered when applied to real-world data. In addition, there is also a problem of simply using a distance such as the Lp distance in a grid or the simple Euclidean distance between two points as the distance between areas. The reason for this problem is that in the real world, the ease of movement between areas for people is not determined solely by the simple physical distance.

In particular, information indicating what transport facilities and means of transportation exist between areas is highly relevant to the ease of movement between areas. For example, even in the case where the Euclidean distance between an area A and an area B is equal to the Euclidean distance between the area A and an area C, the circumstances will be different if a railway line exists between the area A and the area B whereas only a narrow street exists between the area A and the area C. The number of people moving from A to B will be greater than the number of people moving from A to C. A method that uses simple distances is incapable of accounting for the properties and relationships of such movement routes, and therefore the problem of lowered accuracy will arise when such a method is applied to real-world data.

The technology of the disclosure has been devised in light of the above points, and an object thereof is to provide a human mobility estimation device, a human mobility estimation method, and a human mobility estimation program capable of estimating human mobility between areas accurately while accounting for traffic information.

Means for Solving the Problem

A first aspect of the present disclosure is a human mobility estimation device comprising: an intersection determination unit that makes an intersection determination of whether or not a traffic route included in map information intersects a boundary between areas on a basis of the traffic route and an area shape between areas that are adjacent in the map information, the intersection determination being made for each pair of adjacent areas; a movement cost graph construction unit that constructs, on a basis of a weight determined for the boundary in a case where the intersection determination is made that no intersection exists, a movement cost graph expressing a movement cost for each area that accounts for the weight; a shortest distance calculation unit that calculates a corrected shortest distance between areas on a basis of the movement cost graph; and a human mobility estimation unit that estimates a human mobility between areas for each timestep, the timestep being the length of a predetermined time interval, according to a predetermined function for estimating the human mobility between areas on a basis of the corrected shortest distance between areas and a population of each of the areas at different predetermined times.

A second aspect of the present disclosure is a human mobility estimation method executed by a computer, the method comprising: making an intersection determination of whether or not a traffic route included in map information intersects a boundary between areas on a basis of the traffic route and an area shape between areas that are adjacent in the map information, the intersection determination being made for each pair of adjacent areas; constructing, on a basis of a weight determined for the boundary in a case where the intersection determination is made that no intersection exists, a movement cost graph expressing a movement cost for each area that accounts for the weight; calculating a corrected shortest distance between areas on a basis of the movement cost graph; and estimating a human mobility between areas for each timestep, the timestep being the length of a predetermined time interval, according to a predetermined function for estimating the human mobility between areas on a basis of the corrected shortest distance between areas and a population of each of the areas at different predetermined times.

A third aspect of the present disclosure causes a computer to execute a process comprising: making an intersection determination of whether or not a traffic route included in map information intersects a boundary between areas on a basis of the traffic route and an area shape between areas that are adjacent in the map information, the intersection determination being made for each pair of adjacent areas; constructing, on a basis of a weight determined for the boundary in a case where the intersection determination is made that no intersection exists, a movement cost graph expressing a movement cost for each area that accounts for the weight; calculating a corrected shortest distance between areas on a basis of the movement cost graph; and estimating a human mobility between areas for each timestep, the timestep being the length of a predetermined time interval, according to a predetermined function for estimating the human mobility between areas on a basis of the corrected shortest distance between areas and a population of each of the areas at different predetermined times.

Effects of the Invention

According to the human mobility estimation device, the human mobility estimation method, and the human mobility estimation program of the present invention, an effect of estimating human mobility between areas accurately while accounting for traffic information is obtained.

BRIEF DESCRIPTION OF DRAWINGS

FIG. 9 is a diagram illustrating an example of data stored in an area-to-area distance storage DB.

FIG. 10 is a diagram illustrating an example of data saved in a human mobility storage DB.

FIG. 11 is a diagram illustrating an example of an algorithm used by an estimation method.

DESCRIPTION OF EMBODIMENTS

Figure 1:
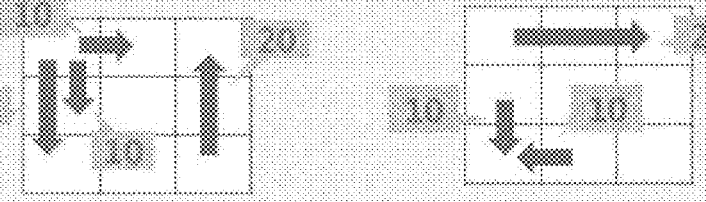
FIG. 1 is a diagram illustrating a representation of the case of outputting human mobility between areas from the numbers of people in each area of a grid at different time periods.

Hereinafter, an example of an embodiment of the disclosed technology will be described with reference to the drawings. Note that in the drawings, structural elements and portions that are identical or substantially the same are denoted with the same reference signs. Also, the dimensional ratios in the diagrams are exaggerated for convenience, and may be different from actual ratios in some cases.

The premise of the technology according to the present disclosure is illustrated in FIG. 1. FIG. 1 is a diagram illustrating a representation of the case of outputting human mobility between areas from the numbers of people in each area of a grid at different time periods. As illustrated in FIG. 1, the human mobility between areas is estimated from the populations of the areas.

The technology of the present disclosure is capable of obtaining an estimation result of the human mobility that accounts for the "ease of movement" between areas by incorporating into the estimation distances that account for map information in the above premise. As a result, a more accurate human mobility estimation result can be obtained.

Hereinafter, a configuration of the present embodiment will be described.

Figure 2:
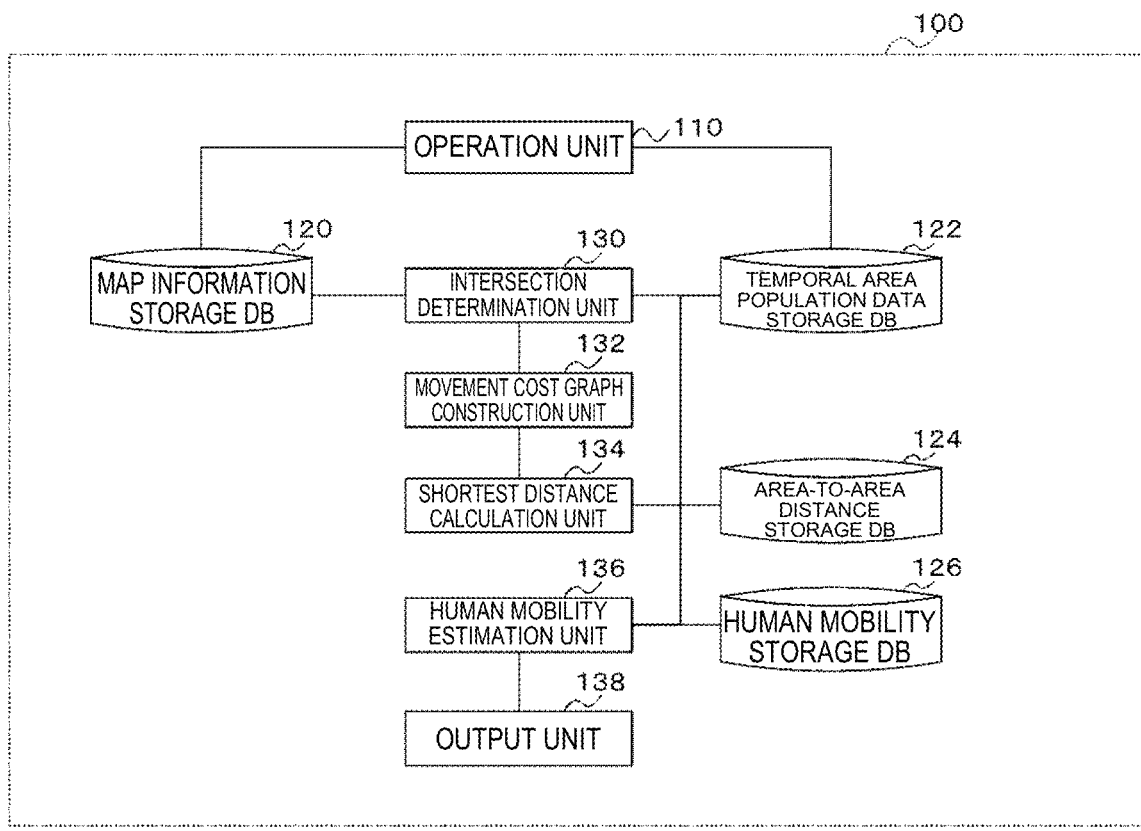
FIG. 2 is a block diagram illustrating a configuration of a human mobility estimation device according to an embodiment.

FIG. 2 is a block diagram illustrating a configuration of a human mobility estimation device according to the present embodiment.

As illustrated in FIG. 2, a human mobility estimation device 100 includes an operation unit 110, a map information storage DB 120, a temporal area population data storage DB 122, an area-to-area distance storage DB 124, a human mobility storage DB 126, an intersection determination unit 130, a movement cost graph construction unit 132, a shortest distance calculation unit 134, a human mobility estimation unit 136, and an output unit 138.

Figures 3, 4, 5:
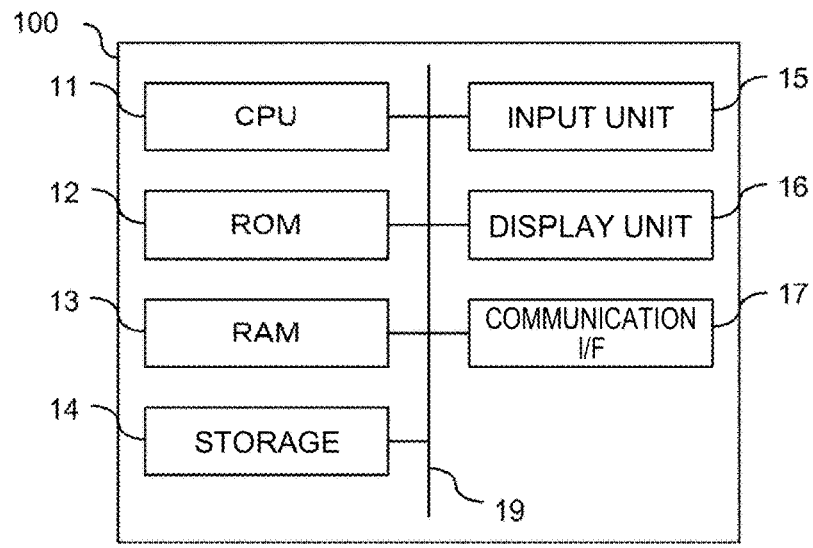
FIG. 3 is a block diagram illustrating a hardware configuration of the human mobility estimation device.
FIG. 4 is a diagram illustrating an example of data stored in a temporal area population data storage DB.
FIG. 5 is a diagram illustrating an example of data stored in a temporal area population data storage DB.

FIG. 3 is a block diagram illustrating a hardware configuration of the human mobility estimation device 100.

As illustrated in FIG. 3, the human mobility estimation device 100 includes a central processing unit (CPU) 11, read-only memory (ROM) 12, random access memory (RAM) 13, storage 14, an input unit 15, a display unit 16, and a communication interface (I/F) 17. The components are communicably interconnected through a bus 19.

The CPU 11 is a central processing unit that executes various programs and controls each unit. In other words, the CPU 11 reads out a program from the ROM 12 or the storage 14, and executes the program by using the RAM 13 as a work area. The CPU 11 follows a program stored in the ROM 12 or the storage 14 to control each of the above components and perform various computational processes. In the present embodiment, a human mobility estimation program is stored in the ROM 12 or the storage 14.

The ROM 12 stores various programs and various data. The RAM 13 stores programs or data temporarily as a work area. The storage 14 includes a hard disk drive (HDD) or a solid-state drive (SSD), and stores various programs, including an operating system, and various data.

The input unit 15 includes a pointing device, such as a mouse, and a keyboard, and is used to perform various inputs.

The display unit 16 is a liquid crystal display for example, and displays various information. The display unit 16 may also adopt a touch panel configuration and function as the input unit 15.

The communication interface 17 is an interface for communicating with other equipment such as a terminal, and a standard such as Ethernet (registered trademark), FDDI, or Wi-Fi (registered trademark) is used, for example.

Next, each functional component of the human mobility estimation device 100 will be described. Each functional component is achieved by causing the human mobility estimation program stored in the ROM 12 or the storage 14 to be read out, loaded into the RAM 13, and executed by the CPU 11.

The operation unit 110 receives various operations with respect to data in the map information storage DB 120. The various operations refer to operations of registering, modifying, and deleting map information recorded in the map information storage DB 120. The operation unit 110 receives various operations with respect to data in the temporal area population data storage DB 122. The various operations refer to operations of registering, modifying, and deleting temporal area population data recorded in the temporal area population data storage DB 122. Additionally, the operation unit 110 receives an instruction to execute the estimation of human mobility.

The map information storage DB 120 stores map information including target areas. The map information includes information about features such as railway lines, highways, and bus routes. As an example, OpenStreetMap data converted into a database format such as PostGIS or the like is conceivable as the map information.

The temporal area population data storage DB 122 stores population data for each area at different time periods. Additionally, the temporal area population data storage DB 122 also stores area shape data for each area. The temporal area population data storage DB 122 stores the shapes of areas in the shapefile format as an example. A shapefile is a map data file containing shape information and attribute information. FIGS. 4 and 5 are diagrams illustrating examples of data stored in the temporal area population data storage DB 122.

The intersection determination unit 130 reads out map information from the map information storage DB 120 and area shape data from the temporal area population data storage DB 122, and for each pair of areas adjacent to each other, makes an intersection determination of whether or not a traffic route intersects the boundary between the areas. A traffic route herein refers to a structure which is expressible as the shape of a curve in a map space, such as a railway line or a highway for example, and also along the curve of which many people may conceivably move.

The movement cost graph construction unit 132 constructs a movement cost graph that expresses a movement cost for each area, on the basis of the intersection determination regarding an area boundary and a traffic route performed by the intersection determination unit 130 and a weight α determined for the boundary in the case of determining that an area boundary and a traffic route do not intersect. The movement cost graph is a graph that treats each area as a vertex and accounts for weights by drawing weighted undirected edges between the vertices representing adjacent areas. Here, when drawing an edge between an area i and an area j, the movement cost graph construction unit 132 assigns the weight 1 if the boundary between the area i and the area j intersects with a traffic route, and assigns the weight α (where α>1) if no intersection exists. The weight α is a parameter that controls how much to consider the existence of a traffic route, and the larger the value, the more importance is placed on the existence of the traffic route. In other words, the weight α is determined according to the type of traffic route that exists near the area. Depending on the type of traffic route, in the case where an area having a highly influential route exists nearby, such as a railway line for example, a relatively larger weight α may be determined. On the other hand, in the case of a bus route or the like, the movement speed is slow compared to a railway line, and therefore a relatively smaller weight α may be determined.

The shortest distance calculation unit 134 calculates the corrected shortest distance between areas on the basis of the movement cost graph, and saves the calculated shortest distance in the area-to-area distance storage DB 124. By performing a shortest route calculation on the movement cost graph constructed by the movement cost graph construction unit 132, the shortest distance calculation unit 134 can calculate the shortest distance between areas corrected to account for the map information. For example, in the case of wanting to obtain the distance between the area i and the area j, the shortest distance calculation unit 134 calculates the shortest distance between the vertex representing i and the vertex representing j on the movement cost graph. On this occasion, calculating the shortest distance between all of the areas requires obtaining the shortest distance between all of the vertices in the movement cost graph. This can be achieved with a computational complexity of $O(N^3)$ using the Warshall-Floyd algorithm taking N to be the number of areas, or with a computational complexity of $O(N^2 \log N)$ by Dijkstra's algorithm treating each vertex as the starting point. The computational complexity of Dijkstra's algorithm uses the property that the number of edges is $O(N)$ because the movement cost graph is a planar graph.

Figure 6:
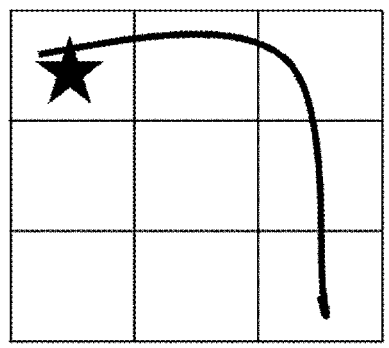
FIG. 6 is a conceptual diagram illustrating an example of the curve of a traffic route.
Figure 7:
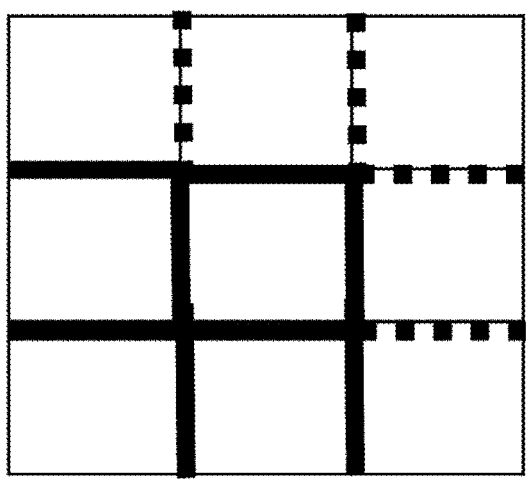
FIG. 7 is a diagram illustrating an example of intersection determination.
Figure 8:
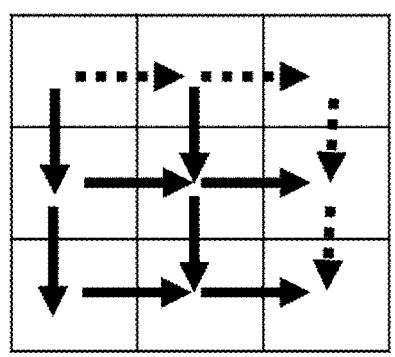
FIG. 8 is a diagram illustrating an example of constructing a movement cost graph and calculating a shortest distance.
Figure 8:

Hereinafter, FIGS. 6 to 8 will be used to describe an example of a method of calculating the shortest distance between areas while accounting for map information by the series of functions of the intersection determination unit 130, the movement cost graph construction unit 132, and the shortest distance calculation unit 134. FIG. 6 is a conceptual diagram illustrating an example of the curve of a traffic route. FIG. 7 is a diagram illustrating an example of an intersection determination. FIG. 8 is a diagram illustrating an example of constructing the movement cost graph and calculating the shortest distance.

As in FIG. 6, consider a case in which areas exist in a grid and a railway line exists as a curve, and at this time it is desirable to obtain the distance from the area marked with the star to the other areas. As illustrated in FIG. 7, first, for each pair of adjacent areas, the intersection determination unit 130 determines whether or not the boundary line between areas crosses a traffic route, which is a railway line in this example. The dashed lines are boundaries determined to have an intersection, while the solid lines are boundaries determined not to have an intersection. Next, on the basis of the intersection determination, the movement cost graph construction unit 132 draws edges to construct a graph (left side of FIG. 8). In this example, α=2. Finally, the shortest distance calculation unit 134 obtains the shortest distance from the vertex representing the area marked with the star (right side of FIG. 8). By adopting such a method, the shortest distance between areas where the railway line exists is calculated to be smaller than the shortest distance between areas where the railway line does not exist, and distances that account for the traffic route are obtained. In this way, the shortest distance between areas corrected to account for traffic information is calculated.

The area-to-area distance storage DB 124 stores the distances between areas calculated above. FIG. 9 is a diagram illustrating an example of data stored in the area-to-area distance storage DB 124.

The human mobility estimation unit 136 reads out the temporal area population data from the temporal area population data storage DB 122 and the corrected shortest distance between areas from the area-to-area distance storage DB 124. Subsequently, the human mobility estimation unit 136 estimates the human mobility between areas for each timestep according to a function for estimating the human mobility between areas on the basis of the corrected shortest distance between areas and the population of each area at different times. The human mobility estimation unit 136 saves an estimation result of the human mobility between areas for each timestep in the human mobility storage DB 126. The human mobility estimation unit 136 uses a time interval saved in the temporal area population data storage DB 122 as the time interval of the timestep. In the present embodiment, the time interval is set to one hour.

FIG. 10 is a diagram illustrating an example of data saved in the human mobility storage DB 126.

The output unit 138 reads out and outputs the estimated human mobility between areas for each timestep from the human mobility storage DB 126.

The above describes each component of the human mobility estimation device 100.

Next, the basic principles of a specific estimation method of the human mobility estimation unit 136 will be described. To describe the functions for estimating human mobility between areas, a notation like the following is defined with respect to the signs used in the estimation.

Namely, V is the set of all areas, and T is the maximum value of the timestep. In other words, the timesteps are t=0, . . . , T−1. Also, G=(V, E) is an undirected graph expressing adjacency relationships between the areas.

Also, $\Gamma_i$ is the set of movement candidate areas from the area i.

Also, $N_{ti}$ is the population in the area i at the time t. Here, t is taken to be t=0, . . . , T−1, and i is taken to be i∈V.

Also, $M_{tij}$ is the number of people who move from the area i to the area j during the period from the time t to the time t+1. Here, t is taken to be t=0, . . . , T−2, while i and j are taken to be i, j∈V.

The above is the symbol notation.

Hereinafter, an objective function for estimation will be defined. First, let $\theta_{ij}$ be the movement probability from the area i to the area j. It is postulated that the human mobility $M_{ti}=\{M_{tij}|j\in V\}$ from the area i at the time t will be generated according to the probability in Expression (1) below, using the movement probability $$\theta_i=\{\theta_{ij}|j\in \Gamma_i\}$$

from i.

[Math. 1]

$$P(M_{ti}|N_{ti},\theta_i) = \frac{N_{ti}!}{\prod_{j\in\Gamma_i} M_{tij}!}\prod_{j\in\Gamma_i}\theta_{ij}^{M_{tij}} \quad (1)$$

Consequently, when given N={$N_{ti}$|0, . . . , T−1, i∈V} and θ={$\theta_i$|i∈V}, the likelihood function of M={$M_{ti}$|0, . . . , T−2, i∈V} becomes Expression (2) below.

[Math. 2]

$$P(M|N,\theta) = \prod_{t=0}^{T-2}\prod_{i\in V}\left(\frac{N_{ti}!}{\prod_{j\in\Gamma_i} M_{tij}!}\prod_{j\in\Gamma_i}\theta_{ij}^{M_{tij}}\right) \quad (2)$$

Taking the logarithm of Expression (2) gives the following Expression (3).

[Math. 3]

$$\log P(M|N,\theta) = \sum_{t=0}^{T-2}\sum_{i\in V}\left(\log N_{ti}! - \sum_{j\in\Gamma_i}\log M_{tij}! + \sum_{j\in\Gamma_i}M_{ij}\log\theta_{ij}\right) \approx$$

$$\sum_{t=0}^{T-2}\sum_{i\in V}\left(N_{ti}\log N_{ti} - N_{ti} - \sum_{j\in\Gamma_i}(M_{tij}\log M_{tij} - M_{tij}) + \sum_{j\in\Gamma_i}M_{tij}\log\theta_{ij}\right) \approx$$

$$\sum_{t=0}^{T-2}\sum_{i\in v}\sum_{j\in\Gamma_i}(\log\theta_{ij}M_{tij} + M_{tij} - M_{tij}\log M_{tij}) + const. \quad (3)$$

The above uses Stirling's approximation $$\log n! \approx n \log n - n$$

for the intermediate transformation. Also, the portion that does not depend on the desired variable to estimate is omitted as a constant.

Additionally, the following Expressions (4) and (5) hold as constraints expressing a law of conservation of the number of people.

[Math. 4]

$$N_{ti} = \sum_{j\in\Gamma_i} M_{tij}(t=0,1,\ldots,T-2) \quad (4)$$

$$N_{t+1,i} = \sum_{j\in\Gamma_i} M_{tji}(t=1,2,\ldots,T-1) \quad (5)$$

Here, it is postulated that the movement probability $\theta_{ij}$ can be approximated from the three elements of the ease of departure from each area, the ease of people congregating to each area, and the influence that distance exerts on the probability of movement. As an example, it is postulated that $\theta_{ij}$ can be written in the form of the following Expression (6a).

[Math. 5]

$$\theta_{ij} = \begin{cases} 1-\pi_i & (i=j) \\ \pi_i \cdot \frac{s_j \cdot \exp(-\beta \cdot d(i,j))}{\sum_{k\in\Gamma_i\setminus\{i\}} s_k \cdot \exp(-\beta \cdot d(i,k))} & (j\neq i, j\in\Gamma_i) \\ 0 & (\text{otherwise}) \end{cases} \quad (6)$$

In the above, π and s are given by Expression (6b) below. Note that k is a constant for setting the total for the movement candidate areas to 1.

[Math. 6]

$$\pi = \{\pi_i | i \in V\} \quad (6b)$$
$$s = \{s_i | i \in V\}$$

Note that $\pi_i$ is a value expressing the ease of departure from the area i, and satisfies $0\le\pi_i\le 1$. Also, $s_i$ is a score expressing the ease of people congregating to the area i, and satisfies $s_i\ge 0$. Note that there is a degree of freedom with regard to the constant multiple of $s_i$. Also, d(i, j) is the distance between the area i and the area j read out from the area-to-area distance storage DB 124. In other words, in d(i, j), the corrected shortest distance between areas is used. Also, β is a parameter expressing the influence that distance exerts on the probability of movement, and satisfies β≥0.

Substituting Expression (6a) into the logarithmic likelihood according to Expression (3) gives the following Expression (7).

[Math. 7]

$$\log P(M \mid N, \pi, s, \beta) = \\ \sum_{t=0}^{T-s} \sum_{i \in V} \log(1 - \pi_i) M_{tii} + \sum_{t=0}^{T-2} \sum_{i \in V} \sum_{j \in \Gamma_i \setminus \{i\}} \left\{ \log \pi_i + \log s_j - \beta \cdot d(i, j) - \log \left( \sum_{k \in \Gamma_i \setminus \{i\}} s_k \exp(-\beta \cdot d(i, k)) \right) \right\} M_{tij} + \\ \sum_{t=0}^{T-2} \sum_{i \in V} \sum_{j \in \Gamma_i} (M_{tij} - M_{tij} \log M_{tij}) + const.$$

The logarithmic likelihood function of Expression (7) is used to estimate M, π, s, and β according to a maximum likelihood estimation. The optimization problem to solve is expressed by the following Expressions (8a) to (8d).

[Math. 8]

$$\text{maximize } \mathcal{L}(M, \pi, s, \beta), \quad (8a)$$

$$\text{subject to } N_{ti} = \sum_{j \in \Gamma_i} M_{tij} \ (t = 0, 1, \ldots, T-2), \quad (8b)$$

$$N_{t+1,i} = \sum_{j \in \Gamma_i} M_{tji} \ (t = 0, 2, \ldots, T-2) \quad (8c)$$

$$M \geq 0 \quad (8d)$$

Also, let the following Expression (9) and (10) hold.

[Math. 9]

$$\mathcal{L}(M, \pi, s, \beta) := \sum_{t=0}^{T-2} \sum_{i \in V} \sum_{j \in \Gamma_i} (\log \theta_{ij} M_{tij} + M_{tij} - M_{tij} \log M_{tij}) \quad (9)$$

$$= \sum_{t=0}^{T-2} \sum_{i \in V} \log(1 - \pi_i) M_{tii} + \\ \sum_{t=0}^{T-2} \sum_{i \in V} \sum_{j \in \Gamma_i \setminus \{i\}} \left\{ \log \pi_i + \log s_j - \beta \cdot d(i, j) - \log \left( \sum_{k \in \Gamma_i \setminus \{i\}} s_k \exp(-\beta \cdot d(i, k)) \right) \right\} M_{tij} + \\ \sum_{t=0}^{T-2} \sum_{i \in V} \sum_{j \in \Gamma_i} (M_{tij} - M_{tij} \log M_{tij}) \quad (10)$$

Although the expressions are solvable in this form, consider solving the optimization problem in the form of Expression (11) below to also account for factors such as the case where noise is present in the observation.

[Math. 10]

$$\mathcal{L}'(M, \pi, s, \beta) = \\ \mathcal{L}(M, \pi, s, \beta) - \frac{\lambda}{2} \sum_{t=0}^{T-2} \left| N_{ti} - \sum_{j \in \Gamma_i} M_{tij} \right|^2 - \frac{\lambda}{2} \sum_{t=0}^{T-2} \left| N_{t+1,i} - \sum_{j \in \Gamma_i} M_{tji} \right|^2 \quad (11)$$

The above is subject to the constraints expressed by the following Expressions (12a) and (12b).

[Math. 11]

$$\text{maximize } L'(M, \pi, s, \beta), \quad (12a)$$

$$\text{subject to } M \geq 0 \quad (12b)$$

Also, λ is a parameter that controls how strongly the constraint is obeyed.

Expression (11) above is a function for estimating the human mobility between areas.

Next, the optimization of M will be described. Because the objective function L' is concave for M, a convex optimization method such as the L-BFGS-B algorithm (see Reference Literature 1) can be used to obtain a globally optimal solution.

[Reference Literature 1] R. H. Byrd, P. Lu, J. Nocedal, and C. Zhu, A Limited Memory Algorithm for Bound Constrained Optimization., SIAM Journal on Scientic Computing, vol. 16, pp. 1190-1208, 1995.

Next, the optimization of π will be described. Rearranging the objective function L' in terms of π and β gives the following Expression (13a).

[Math. 12]

$$\mathcal{L}' = \sum_{i \in V} \left[ \log(1 - \pi_i) \cdot \left( \sum_{t=0}^{T-s} M_{tii} \right) + \log \pi_i \cdot \left( \sum_{t=0}^{T-2} \sum_{j \in \Gamma_i \setminus \{i\}} M_{tij} \right) \right] \quad (13a)$$

In the above, the portion not dependent on π and β is omitted. The value π* that would maximize the expression can be denoted by a closed form like the following Expression (13b) by Lagrange's method of undetermined multipliers.

[Math. 13]

$$\pi_i^* = \frac{\sum_{t=0}^{T-2} \sum_{j \in \Gamma_i \setminus \{i\}} M_{tij}}{\sum_{t=0}^{T-2} \sum_{j \in \Gamma_i} M_{tij}} \quad (13b)$$

Next, the optimization of s and β will be described. Rearranging the objective function L' in terms of s and β gives the following Expression (14a).

[Math. 14]

$$\mathcal{L}' = \sum_{i \in V} \left[ A_i \log s_i - B_i \log \left( \sum_{k \in \Gamma_i \setminus \{i\}} s_k \exp(-\beta \cdot d(i, k)) \right) \right] - \beta D \quad (14b)$$

In the above, $A_i$ and $D$ are given by the following Expression (14b).

[Math. 15]

$$A_i := \sum_{t=0}^{T-2} \sum_{j \in \Gamma_i \setminus \{i\}} M_{tji}, \tag{14b}$$

$$B_i := \sum_{t=0}^{T-2} \sum_{j \in \Gamma_i \setminus \{i\}} M_{tij},$$

$$D := \sum_{t=0}^{T-2} \sum_{i \in V} \sum_{j \in \Gamma_i \setminus \{i\}} d(i, j) \cdot M_{tij}$$

In the above, the portion not dependent on $\pi$ and $\beta$ is omitted. For simplicity, the right side is denoted $f(s, \beta)$.

To maximize $f(s, \beta)$, a framework referred to as the Minorization-Maximization algorithm (hereinafter, the MM algorithm; see Reference Literature 2) is used. The MM algorithm is a technique of generating a candidate point sequence in cases where directly maximizing a function is difficult, and works by iteratively solving a maximization problem of an approximation function for the lower bound.

[Reference Literature 2] D. R. Hunter. MM algorithms for generalized Bradley-Terry models. The Annals of Statistics, Vol. 32, No. 1, pp. 384-406, Feb. 2003.

A specific method of applying the MM algorithm will be described. The following Expression (15) holds for x, y>0.

[Math. 16]

$$-\log x \geq 1 - \log y - \frac{x}{y} \tag{15}$$

In the above, $x_i$ and $y_i$ are given by the following Expression (16).

[Math. 17]

$$x_i = \sum_{k \in \Gamma_i \setminus \{i\}} s_k \exp(-\beta \cdot d(i, k)) \tag{16}$$

$$y_i = \sum_{k \in \Gamma_i \setminus \{i\}} s_k^{(u)} \exp(-\beta^{(u)} \cdot d(i, k))$$

Expression (15) is applied to $i \in V$ to obtain the following Expression (17).

[Math. 18]

$$f(s, \beta) \geq \sum_{i \in V} \left[ A_i \log s_i - C_i^{(u)} \sum_{k \in \Gamma_i \setminus \{i\}} s_k \exp(-\beta \cdot d(i, k)) \right] - \beta D \tag{17}$$

In the above, $C_i^{(u)}$ is expressed by the following Expression (18).

[Math. 19]

$$C_i^{(u)} := \frac{B_i}{\sum_{k \in \Gamma_i \setminus \{i\}} s_k^{(u)} \exp(-\beta^{(u)} \cdot d(i, k))} \tag{18}$$

If the right side of Expression (17) is denoted $f_{(u)}(s, \beta)$, the properties of the following Expressions (19) and (20) hold.

[Math. 20]

$$f(s^{(u)}, \beta^{(u)}) = f^{(u)}(s^{(u)}, \beta^{(u)}) \tag{19}$$

$$f(s, \beta) \geq f^{(u)}(s, \beta)(\forall s, \beta) \tag{20}$$

Using the above, $f(s, \beta)$ is maximized by Algorithm 1 in FIG. 11. In Algorithm 1, the objective function $f(s, \beta)$ increases monotonically, as demonstrated by Expression (21a).

[Math. 21]

$$\begin{aligned} f(s^{(u+1)}, \beta^{(u+1)}) &\geq f^{(u)}(s^{(u+1)}, \beta^{(u+1)}) & (\because (20)) \\ &\geq f^{(u)}(s^{(u+1)}, \beta^{(u)}) \geq f^{(u)}(s^{(u)}, \beta^{(u)}) \\ &= f^{(u)}(s^{(u)}, \beta^{(u)}) & (\because (19)) \end{aligned} \tag{21a}$$

Next, the formula for updating s and $\beta$ in Algorithm 1 will be derived. First, consider a substitution like the following for $s^{(u+1)}$.

$$s^{(u+1)} \leftarrow \arg\max_{s} f^{(u)}(s, \beta^{(u)})$$

Because the following Expression (21b) holds, $s^{(u+1)}$ can be obtained in a closed form.

[Math. 22]

$$\frac{\partial f^{(u)}(s, \beta^{(u)})}{\partial s_i} = 0 \Leftrightarrow s_i = \frac{A_i}{\sum_{k \in \Gamma_i \setminus \{i\}} C_k^{(u)} \exp(-\beta^{(u)} \cdot d(k, i))} \tag{21b}$$

Next, consider a substitution like the following for $\beta^{(u+1)}$.

$$s^{(u+1)} \leftarrow \arg\max_{s} f^{(u)}(s, \beta^{(u)})$$

By a simple calculation, the following can be confirmed for $\forall \beta \in R$ (where R is the set of real numbers).

$$\frac{\partial^2 f^{(u)}(\varepsilon^{(u+1)}, \beta)}{\partial \beta^2} < 0$$

In other words, f(u) is a concave function with respect to $\beta$. Consequently, to obtain $\beta^{(u+1)}$, it is sufficient to solve a concave, single-variable function maximization problem with respect to β, and $\beta^{(u+1)}$ can be obtained efficiently by a technique such as the golden-section search or Newton's method.

The above is a description of the basic principles of the estimation method.

Next, the operations of the human mobility estimation device 100 will be described.

Figure 12:
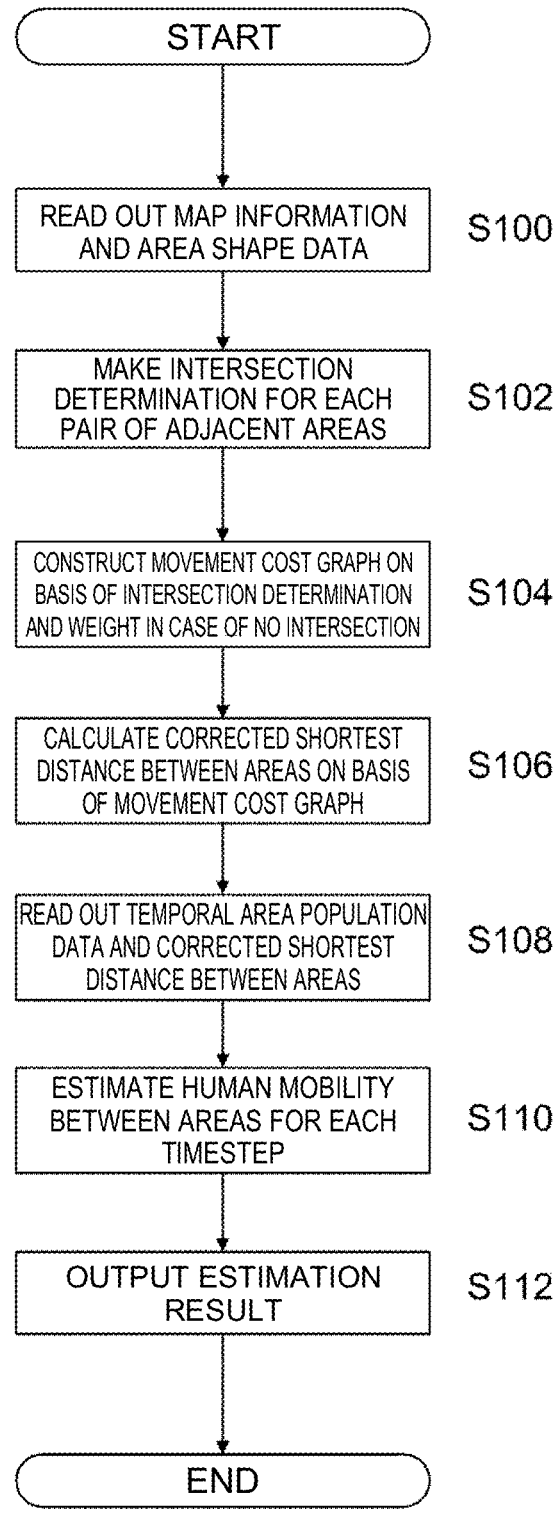
FIG. 12 is a flowchart illustrating the flow of a human mobility estimation process by a human mobility estimation device.

FIG. 12 is a flowchart illustrating the flow of the human mobility estimation process by the human mobility estimation device 100. The human mobility estimation process is performed by causing the human mobility estimation program to be read out from the ROM 12 or the storage 14, loaded into the RAM 13, and executed by the CPU 11. The human mobility estimation device 100 executes the following process upon receiving an instruction to estimate the human mobility through the operation unit 110. Note that data is preregistered in the map information storage DB 120 and the temporal area population data storage DB 122.

In step S100, the CPU 11 acts as the intersection determination unit 130 to read out map information from the map information storage DB 120 and area shape data from the temporal area population data storage DB 122.

In step S102, the CPU 11 acts as the intersection determination unit 130 to make the intersection determination of whether or not a traffic route intersects a boundary between areas, the determination being made for each pair of adjacent areas.

In step S104, the CPU 11 acts as the movement cost graph construction unit 132 to construct a movement cost graph expressing the movement cost for each area on the basis of the intersection determination made by the intersection determination unit 130 and the weight λ determined for a boundary in the case where the intersection determination is made that no intersection exists.

In step S106, the CPU 11 acts as the shortest distance calculation unit 134 to calculate the corrected shortest distance between areas on the basis of the movement cost graph, and saves the calculated shortest distance in the area-to-area distance storage DB 124.

In step S108, the CPU 11 acts as the human mobility estimation unit 136 to read out temporal area population data from the temporal area population data storage DB 122 and the corrected shortest distance between areas from the area-to-area distance storage DB 124.

In step S110, the CPU 11 acts as the human mobility estimation unit 136 to estimate the human mobility between areas for each timestep according to the function in Expression (11) above, on the basis of the corrected shortest distance between areas and the population of each area at different times.

In step S112, the CPU 11 acts as the output unit 138 to output the human mobility between areas for each timestep estimated in step S110 as an estimation result.

According to the human mobility estimation device 100 of the present embodiment as described above, human mobility between areas can be estimated accurately while accounting for traffic information.

Note that the human mobility estimation executed by the CPU loading software (a program) in the foregoing embodiment may also be executed by any of various types of processors other than a CPU. The processor in this case may be an programmable logic device (PLD) whose circuit configuration is changeable after fabrication, such as a field-programmable gate array (FPGA), or a special-purpose electric circuit that acts as a processor having a circuit configuration specially designed to execute a specific process, such as an application-specific integrated circuit (ASIC), for example. In addition, the human mobility estimation may also be executed by a single processor from among these various types, or by a combination of two or more processors of the same or different types (such as a combination of multiple FPGAs, or a CPU and an FPGA, for example). Furthermore, the hardware structure of these various types of processors is more specifically an electric circuit combining circuit elements such as semiconductor elements.

Additionally, the foregoing embodiment describes an aspect in which the human mobility estimation program is stored (installed) in advance in the storage 14, but is not limited thereto. The program may also be provided by being stored on a non-transitory storage medium such as Compact Disc-Read-Only Memory (CD-ROM), Digital Versatile Disc-Read-Only Memory (DVD-ROM), or Universal Serial Bus (USB) memory. Furthermore, the program may also be downloaded from an external device over a network.

The following supplement is additionally disclosed regarding the foregoing embodiment.

(Supplementary Item 1)

A human mobility estimation device comprising:

a memory; and at least one processor connected to the memory, wherein the processor is configured to make an intersection determination of whether or not a traffic route included in map information intersects a boundary between areas on a basis of the traffic route and an area shape between areas that are adjacent in the map information, the intersection determination being made for each pair of adjacent areas, construct, on a basis of a weight determined for the boundary in a case where the intersection determination is made that no intersection exists, a movement cost graph expressing a movement cost for each area that accounts for the weight, calculate a corrected shortest distance between areas on a basis of the movement cost graph, and estimate a human mobility between areas for each timestep, the timestep being the length of a predetermined time interval, according to a predetermined function for estimating the human mobility between areas on a basis of the corrected shortest distance between areas and a population of each of the areas at different predetermined times.

(Supplementary Item 2)

A non-transitory storage medium storing a human mobility estimation program that causes a computer to execute a process comprising:

making an intersection determination of whether or not a traffic route included in map information intersects a boundary between areas on a basis of the traffic route and an area shape between areas that are adjacent in the map information, the intersection determination being made for each pair of adjacent areas;

constructing, on a basis of a weight determined for the boundary in a case where the intersection determination is made that no intersection exists, a movement cost graph expressing a movement cost for each area that accounts for the weight;

calculating a corrected shortest distance between areas on a basis of the movement cost graph; and estimating a human mobility between areas for each timestep, the timestep being the length of a predetermined time interval, according to a predetermined function for estimating the human mobility between areas on a basis of the corrected shortest distance between areas and a population of each of the areas at different predetermined times.

REFERENCE SIGNS LIST 100 human mobility estimation device
110 operation unit
120 map information storage DB
122 temporal area population data storage DB
124 area-to-area distance storage DB
126 human mobility storage DB
130 intersection determination unit
132 movement cost graph construction unit
134 shortest distance calculation unit
136 human mobility estimation unit
138 output unit

The invention claimed is:

1. A human mobility estimation device comprising:
an intersection determiner configured to determine an intersection determination of whether or not a traffic route included in map information intersects a boundary between areas on a basis of the traffic route and an area shape between areas that are adjacent in the map information, the intersection determination being made for each pair of adjacent areas;
a movement cost graph constructor configured to construct, on a basis of a weight determined for the boundary in a case where the intersection determination is made that no intersection exists, a movement cost graph expressing a movement cost for each area that accounts for the weight;
a shortest distance determiner configured to determine a corrected shortest distance between areas on a basis of the movement cost graph; and
a human mobility estimator configured to estimate a human mobility between areas for each timestep, the timestep being a length of a predetermined time interval, according to a predetermined function for estimating the human mobility between areas on a basis of the corrected shortest distance between areas and a population of each of the areas at different predetermined times, and
causing the human mobility estimation device to output the estimated human mobility based on a traffic information, wherein the traffic information excludes individual human information.

2. The human mobility estimation device according to claim 1, wherein
the predetermined function approximates a movement probability of the human mobility between areas from respective elements of an ease of departure from each area, an ease of people congregating to each area, and an influence that a distance exerts on the probability of movement, and uses the corrected shortest distance between areas as the distance.

3. The human mobility estimation device according to claim 1, wherein
the weight is determined according to a type of the traffic route that exists near the area.

4. A human mobility estimation method executed by a computer, the method comprising:
determining, by an intersection determiner, an intersection determination of whether or not a traffic route included in map information intersects a boundary between areas on a basis of the traffic route and an area shape between areas that are adjacent in the map information, the intersection determination being made for each pair of adjacent areas;
constructing, by a movement cost graph constructor on a basis of a weight determined for the boundary in a case where the intersection determination is made that no intersection exists, a movement cost graph expressing a movement cost for each area that accounts for the weight;
determining, by a shortest distance determiner, a corrected shortest distance between areas on a basis of the movement cost graph; and
estimating, by a human mobility estimator, a human mobility between areas for each timestep, the timestep being a length of a predetermined time interval, according to a predetermined function for estimating the human mobility between areas on a basis of the corrected shortest distance between areas and a population of each of the areas at different predetermined times, and
outputting the estimated human mobility based on a traffic information, wherein the traffic information excludes individual human information.

5. The human mobility estimation method according to claim 4, wherein
the predetermined function approximates a movement probability of the human mobility between areas from respective elements of an ease of departure from each area, an ease of people congregating to each area, and an influence that a distance exerts on the probability of movement, and uses the corrected shortest distance between areas as the distance.

6. The human mobility estimation method according to claim 4, wherein
the weight is determined according to a type of the traffic route that exists near the area.

7. A computer-readable non-transitory recording medium storing computer-executable estimation program instructions that when executed by a processor cause a computer system to:
determine, by an intersection determiner, an intersection determination of whether or not a traffic route included in map information intersects a boundary between areas on a basis of the traffic route and an area shape between areas that are adjacent in the map information, the intersection determination being made for each pair of adjacent areas;
construct, by a movement cost graph constructor on a basis of a weight determined for the boundary in a case where the intersection determination is made that no intersection exists, a movement cost graph expressing a movement cost for each area that accounts for the weight;
determine, by a shortest distance determiner, a corrected shortest distance between areas on a basis of the movement cost graph; and
estimating, by a human mobility estimator, a human mobility between areas for each timestep, the timestep being a length of a predetermined time interval, according to a predetermined function for estimating the human mobility between areas on a basis of the corrected shortest distance between areas and a population of each of the areas at different predetermined times, and
outputting the estimated human mobility based on a traffic information, wherein the traffic information excludes individual human information.

8. The human mobility estimation device according to claim 2, wherein
the weight is determined according to a type of the traffic route that exists near the area.

9. The human mobility estimation device according to claim 2, wherein the movement cost graph includes a plurality of vertices representing respective areas of the areas and a weighted undirected edges between two vertices of the plurality of vertices, the two vertices representing two adjacent areas.

10. The human mobility estimation device according to claim 2, wherein the corrected shortest distance is based on a computational complexity of using Warshall-Floyd algorithm.

11. The human mobility estimation device according to claim 2, wherein the corrected shortest distance is based on a computational complexity of using Dijkstra's algorithm.

12. The human mobility estimation method according to claim 5, wherein
the weight is determined according to a type of the traffic route that exists near the area.

13. The human mobility estimation method according to claim 5, wherein the movement cost graph includes a plurality of vertices representing respective areas of the areas and a weighted undirected edges between two vertices of the plurality of vertices, the two vertices representing two adjacent areas.

14. The human mobility estimation method according to claim 5, wherein the corrected shortest distance is based on a computational complexity of using Warshall-Floyd algorithm.

15. The human mobility estimation method according to claim 5, wherein the corrected shortest distance is based on a computational complexity of using Dijkstra's algorithm.

16. The computer-readable non-transitory recording medium of claim 7, wherein
the predetermined function approximates a movement probability of the human mobility between areas from respective elements of an ease of departure from each area, an ease of people congregating to each area, and an influence that a distance exerts on the probability of movement, and uses the corrected shortest distance between areas as the distance.

17. The computer-readable non-transitory recording medium of claim 7, wherein
the weight is determined according to a type of the traffic route that exists near the area.

18. The computer-readable non-transitory recording medium of claim 16, wherein
the weight is determined according to a type of the traffic route that exists near the area.

19. The computer-readable non-transitory recording medium of claim 16,
wherein the movement cost graph includes a plurality of vertices representing respective areas of the areas and a weighted undirected edges between two vertices of the plurality of vertices, the two vertices representing two adjacent areas.

20. The computer-readable non-transitory recording medium of claim 16, wherein the corrected shortest distance is based on a computational complexity of using at least one of Warshall-Floyd algorithm or Dijkstra's algorithm.

* * * * *